US008650768B2

(12) United States Patent
Fan

(10) Patent No.: US 8,650,768 B2
(45) Date of Patent: Feb. 18, 2014

(54) TESTING DEVICE FOR PLANENESS

(75) Inventor: Xian-Gang Fan, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 180 days.

(21) Appl. No.: 13/418,364

(22) Filed: Mar. 13, 2012

(65) Prior Publication Data

US 2013/0104412 A1 May 2, 2013

(30) Foreign Application Priority Data

Oct. 28, 2011 (CN) .......................... 2011 1 0333565

(51) Int. Cl.
G01B 5/20 (2006.01)
(52) U.S. Cl.
USPC ............................................ 33/533; 33/1 BB
(58) Field of Classification Search
USPC ......... 33/1 BB, 1 V, 533, 549, 551, 552, 553, 33/554, 555, 712
See application file for complete search history.

(56) References Cited

U.S. PATENT DOCUMENTS

| 4,221,053 | A | * | 9/1980 | Bobel et al. | 33/552 |
| 5,048,195 | A | * | 9/1991 | Leonov | 33/533 |
| 6,085,429 | A | * | 7/2000 | Cresgy et al. | 33/533 |
| 6,108,924 | A | * | 8/2000 | Jang et al. | 33/552 |
| 2009/0277030 | A1 | * | 11/2009 | Zhang | 33/533 |
| 2013/0000137 | A1 | * | 1/2013 | Wang | 33/533 |
| 2013/0239425 | A1 | * | 9/2013 | Ham | 33/533 |

* cited by examiner

Primary Examiner — G. Bradley Bennett
(74) Attorney, Agent, or Firm — Altis Law Group, Inc.

(57) ABSTRACT

A testing device for testing whether planeness of top and bottom surfaces of an object is within an allowable range includes a rack, a motion mechanism, a transmission mechanism, a control mechanism, a testing mechanism, and a display. The motion mechanism is slidably connected to the rack and supporting the object. The transmission mechanism is fastened to the rack and the motion mechanism. The testing mechanism includes two separated rows of sensors. The object extends through the testing mechanism, between the rows of sensors. The sensors above the object measure distances between the sensors and corresponding dots of a top surface of the object. The sensors below the object measure distances between the sensors and corresponding dots of a bottom surface of the object. The sensors send signals about the distances to the control mechanism.

8 Claims, 3 Drawing Sheets

TESTING DEVICE FOR PLANENESS

BACKGROUND

1. Technical Field

The present disclosure relates to a device for testing planeness.

2. Description of Related Art

In the productive process of an industrial product, such as a server, the chassis of the server easily deforms because of limitations in productive technologies and methods. Therefore, it is necessary to test the planeness of the top and bottom planes of the chassis. A dial indicator is generally used for testing the planeness of the planes. The dial indicator measures data of a plurality of dots of the planes, and then the data is analyzed to determine whether the planeness is qualified, which is often inefficient and inaccurate.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
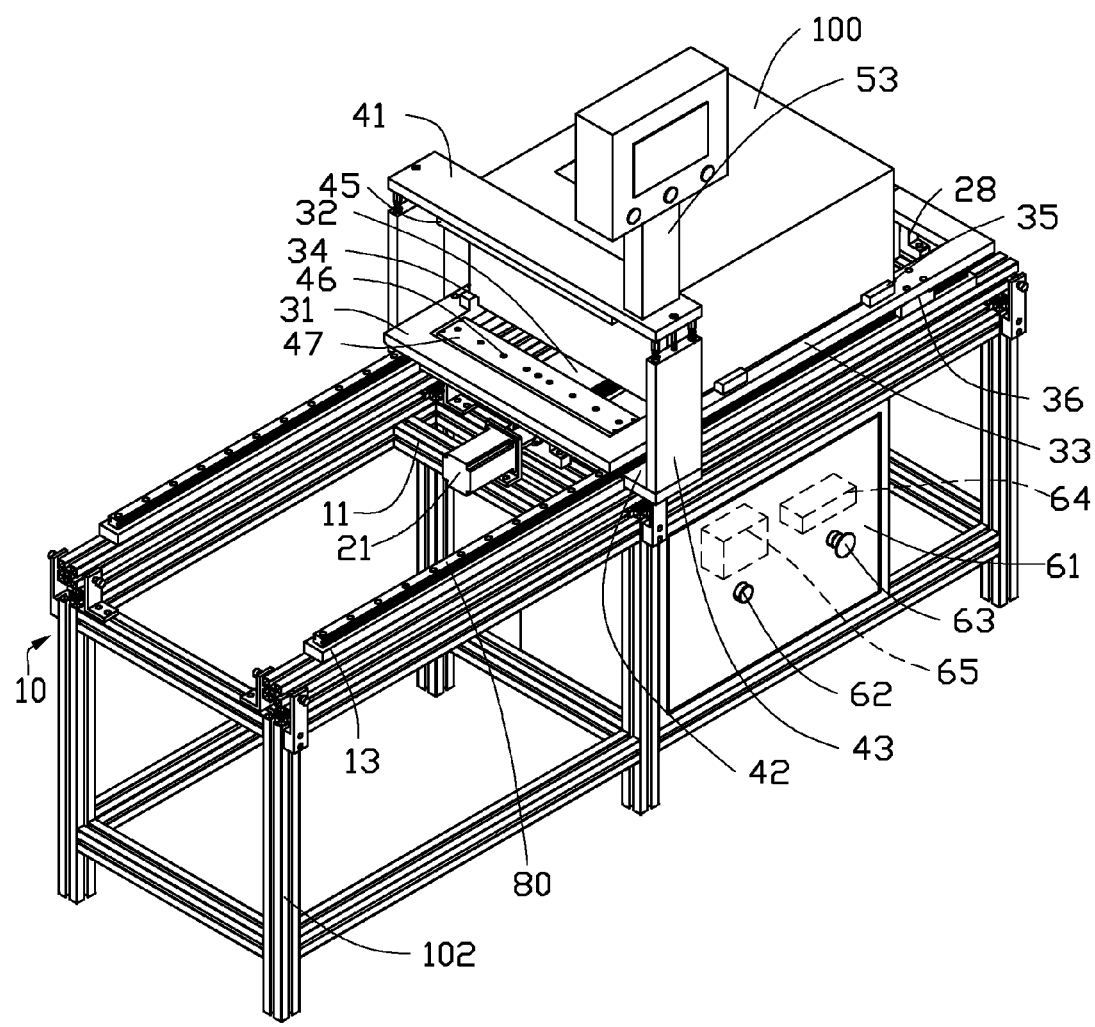
FIG. 1 is an assembled, isometric view of an exemplary embodiment of a testing device, together with an object to be tested, wherein the testing device includes a transmission mechanism.
Figure 2:
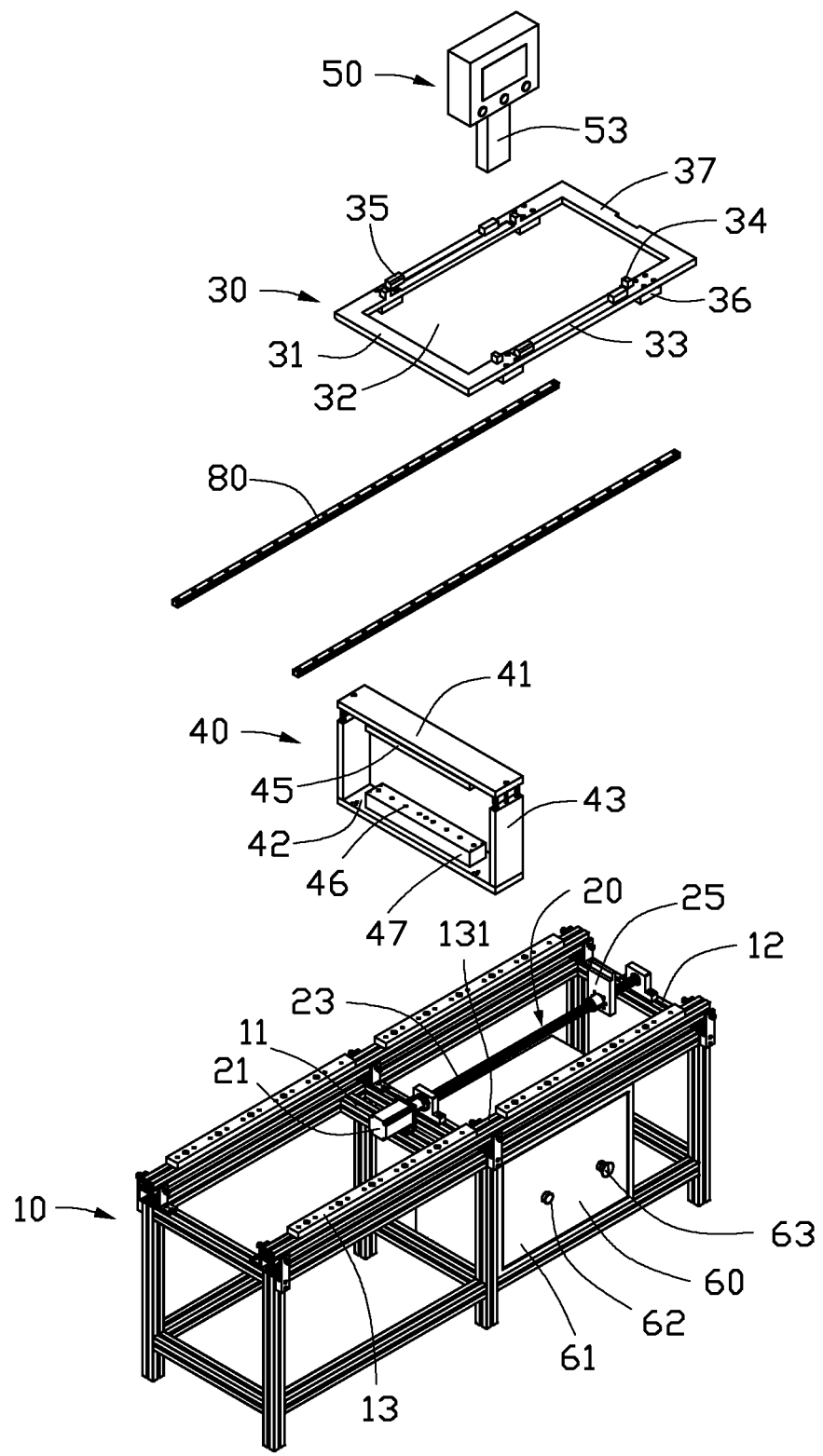
FIG. 2 is an exploded, isometric view of the testing device of FIG. 1.

FIGS. 1 and 2, show an exemplary embodiment of a testing device used for testing whether planeness of top and bottom surfaces of an object 100 is within an allowable range. The testing device includes a rack 10, a transmission mechanism 20, a motion mechanism 30, a testing mechanism 40, a display 50 with a mounting portion 53 extending down from the bottom of the display 50, a control mechanism 60, and two slide rails 80.

The rack 10 includes a rectangular frame 102, two supporting arms 13 longitudinally fastened on opposite sides of a top of the rack 10. Two first brackets 11 are connected between a middle of each the opposite sides of the rack 10, adjacent to the top of the rack 10, and a second bracket 12 is connected between first ends of the opposite sides of the rack 10. The second bracket 12 is coplanar with the first brackets 11. A receiving slot 131 is defined in a middle of each supporting arm 13.

Figure 3:
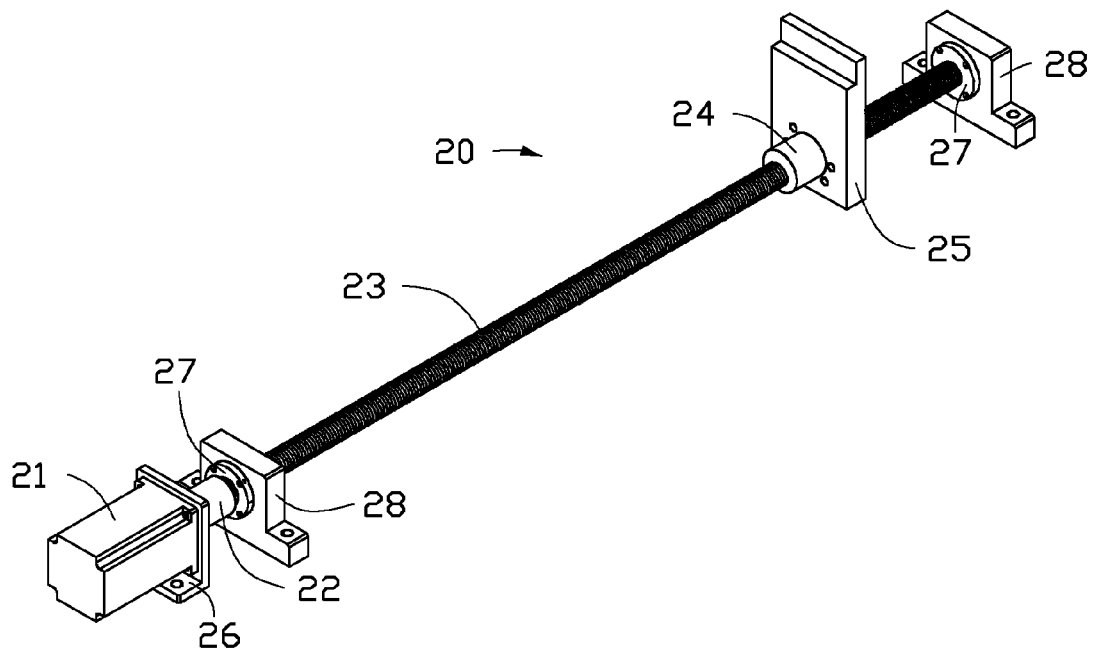
FIG. 3 is an enlarged view of the transmission mechanism of FIG. 1.

FIG. 3, shows the transmission mechanism 20 including a coupling portion 22, a motor 21 and a screw shaft 23 respectively connected to opposite ends of the coupling portion 22, a screw nut 24 connected to the screw shaft 23, and a drive plate 25 fastened to the screw nut 24. The motor 21 is fastened to a fastening base 26. Two bearings 27 are fastened to opposite ends of the screw shaft 23. Each bearing 27 is fastened to an inside of a supporting base 28.

The motion mechanism 30 includes a rectangular slide member 31 and four slide blocks 36. The slide member 31 includes two long slide portions 33 and two short connecting portions 37 connected between corresponding ends of the slide portions 33. The slide portions 33 and the connecting portions 37 together bound an opening 32. Two first positioning blocks 34 protrude up from each slide portion 33, adjacent to the opposite ends of the slide portion 33. Two second positioning blocks 35 protrude up from each slide portion 33, between the first positioning blocks 34. Two of the slide blocks 36 protrude from opposite ends of a bottom of a corresponding one of the slide portions 33, and the other two of the slide blocks 36 protrude from opposite ends of a bottom of the other slide portion 33.

The testing mechanism 40 is a rectangular frame, including a top plate 41, a bottom plate 42 opposite and parallel to the top plate 41. Two end plates 43 respectively connected between opposite ends of the top plate 41 and the bottom plate 42, a first fastening plate 45 fastened to a bottom surface of the top plate 41 facing the bottom plate 42, a second fastening plate 47 fastened to a top surface of the bottom plate 42 facing the top plate 41, and a plurality of sensors 46. Half of the sensors 46 are fastened to the second fastening plate 47, arranged in a row. The remanding sensors 46 are fastened to the first fastening plate 45, arranged in a row.

The control mechanism 60 includes a box 61 fastened in the rack 10, a programmable logic controller (PLC) 64 electrically connected to the sensors 46 and the display 50, a motor controller 65 electrically connected to the motor 21, a forward button 62 exposed out of the box 61, and a backward button 63 exposed out of the box 61. The PLC 64 and motor controller 65 are mounted in the box 61.

In assembly, the supporting base 28 away from the motor 21 is fastened on the second bracket 12. The other supporting base 28 and the fastening base 26 are respectively fastened on the top surfaces of the first brackets 11. The bottom plate 42 is fastened to the rack 10, with opposite ends of the bottom plate 42 respectively received in the receiving slots 131. The mounting portion 53 is fastened on a top surface of the top plate 41. The slide rails 80 are respectively fastened on top surfaces of the supporting arms 13, extending above the bottom plate 42. The slide blocks 36 slidably engage with the corresponding slide rails 80. The slide portions 33 extend above the corresponding slide rails 80, respectively at opposite ends of the second fastening plate 46. The slide blocks 36 are slid toward the drive plate 25, to allow the rear connecting portion 37 to fasten to a top end of the drive plate 25. An upper portion of the second fastening plate 47 is received in the opening 32.

In use, the object 100 is supported on the slide portions 33 of the slide member 31. Opposite ends of the object 100 abut against the corresponding first positioning blocks 34, and opposite sides of the object 100 abut against the corresponding second positioning blocks 35. After the forward button 62 is pressed, the motor controller 65 controls the motor 21 to operate. The screw shaft 23 is rotated, to move the screw nut 24 together with the drive plate 25 toward the motor 21. The drive plate 25 drives the motion mechanism 30 to move forward. The object 100 extends through the testing mechanism 40, between the first and second fastening plates 45 and 47. The sensors 46 fastened to the first fastening plate 45 respectively measure distances between the sensors 46 and the corresponding dots of the top surface of the object 100, and the sensors 46 fastened to the second fastening plate 46 respectively measure distances between the sensors 46 and the corresponding dots of the bottom surface of the object 100. The sensors 46 then send signals in relation to the distances to the PLC 64. The PLC 64 compares obtained distances with standard distances to determine whether the planeness of the top and bottom surfaces of the object 100 is within an allowable range. The comparison result is displayed by the display 50.

After the test is completed, the forward button 62 is pressed to stop the motor 21. The backward button 63 is pressed to allow the motor 21 to rotate reversely, thereby making the slide member 31 return back.

It is believed that the present embodiments and their advantages will be understood from the foregoing description, and various changes may be made thereto without departing from the spirit and scope of the description or sacrificing all of their material advantages, the examples hereinbefore described merely being exemplary embodiments.

What is claimed is:

1. A testing device for testing whether planeness of a top surface and a bottom surface of an object is within an allowable range, comprising:
    a rack;
    a motion mechanism slidably mounted on the rack to support the object, the motion mechanism comprising a slide member defining an opening;
    a transmission mechanism fastened to the rack and connected to the motion mechanism;
    a control mechanism controlling the transmission mechanism to operate, thereby driving the motion mechanism to slide along the rack;
    a testing mechanism fastened on the rack and comprising two rows of sensors electrically connected to the control mechanism, the rows of sensors spaced apart from each other, between which the object is operable to extend through with the slide member; and
    a display connected to the control mechanism;
    wherein when the object extends through the rows of sensors, the sensors above the object respectively measure distances between the sensors above the object and corresponding dots of the top surface of the object, and the sensors below the workpiece respectively measure distances between the sensors below the object and corresponding dots of the bottom surface of the object, the sensors send signals about the distances to the control mechanism, the control mechanism determines whether planeness of the top and bottom surfaces of the object is within an allowable range, the control mechanism further controls the display to display the determination result.

2. The testing device of claim 1, wherein two supporting arms are respectively fastened on opposite sides of a top of the rack, a receiving slot is defined in a middle of each supporting arm, the testing mechanism comprises a top plate, and a bottom plate opposite to the top plate, opposite ends of the bottom plate are respectively received in the receiving slots, the rows of sensors are respectively fastened on inner surfaces of the top plate and the bottom plate.

3. The testing device of claim 2, wherein two slide rails are respectively fastened to tops of the supporting arms, a plurality of slide blocks extends down from a bottom of the slide member for slidably engaging with the corresponding slide rails.

4. The testing device of claim 2, wherein the display comprises a mounting portion to fasten the display to a top surface of the top plate of the testing mechanism.

5. The testing device of claim 1, wherein the transmission mechanism comprises a motor, a screw shaft connected to the motor to be controlled by the motor to rotate, a screw nut connected to the screw shaft, and a drive plate fastened to the screw nut, the drive plate is fastened to the slide member to drive the slide member to move in response to the screw shaft rotating.

6. The testing device of claim 5, wherein the control mechanism comprises a box fastened in the rack, a programmable logic controller (PLC) electrically connected to the sensors and the display, and a motor controller electrically connected to the motor, the motor controller controls the motor to operate, the PLC receives the signals about the distances from the sensors, and then determines whether planeness of the top and bottom surfaces of the object is within the allowable range.

7. The testing device of claim 5, wherein the control mechanism further comprises a fastening base and two supporting bases all fastened to the rack, and two bearings fastened to the supporting bases, the motor is fastened to the fastening base, opposite ends of the screw shaft are connected to the corresponding bearings.

8. The testing device of claim 7, wherein three brackets are connected to opposite sides of the rack, the fastening base and the supporting bases are fastened on the brackets.

* * * * *